(No Model.)  2 Sheets—Sheet 1.
H. F. CAMPBELL.
BARREL HOOP PLANING MACHINE.
No. 248,021.  Patented Oct. 11, 1881.
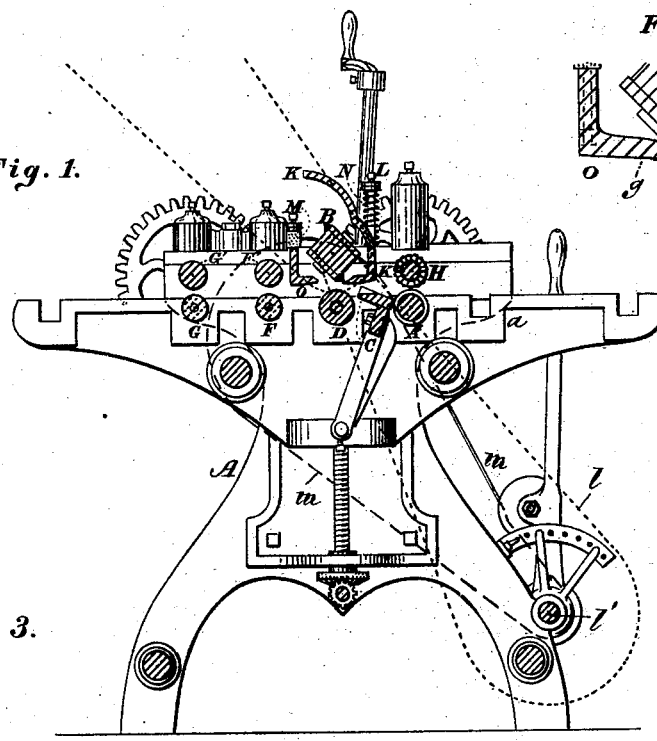
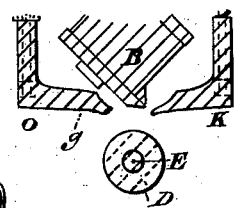
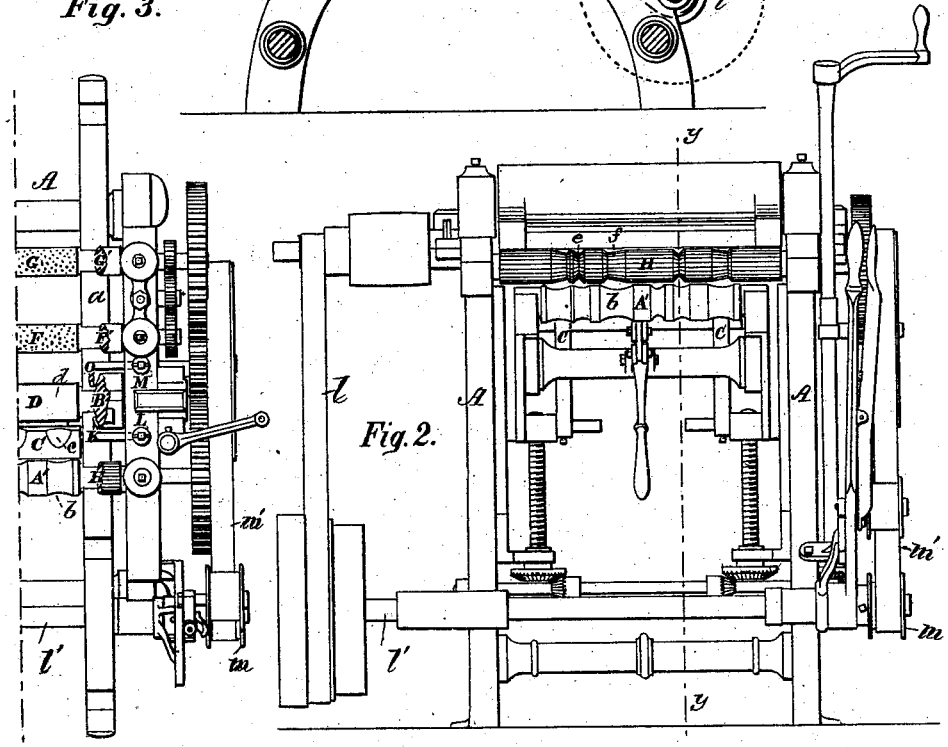
WITNESSES,
Wells L. Johnson
Harry M. Cary
INVENTOR,
Henry F. Campbell
PER Edgar H. Woodman
ATTORNEY.

(No Model.) 2 Sheets—Sheet 2.

H. F. CAMPBELL.
BARREL HOOP PLANING MACHINE.

No. 248,021. Patented Oct. 11, 1881.

Witnesses:
Archwell Libby
Wells H. Johnson

Inventor;
Henry F. Campbell
per
Edgar H. Woodman
Attorney.

UNITED STATES PATENT OFFICE.

HENRY F. CAMPBELL, OF CONCORD, NEW HAMPSHIRE, ASSIGNOR TO THE AMERICAN HOOP DRESSING COMPANY, OF SAME PLACE.

BARREL-HOOP-PLANING MACHINE.

SPECIFICATION forming part of Letters Patent No. 248,021, dated October 11, 1881.

Application filed April 27, 1881. (No model.)

*To all whom it may concern:*

Be it known that I, HENRY F. CAMPBELL, a citizen of the United States, residing at Concord, in the county of Merrimac and State of New Hampshire, have invented certain new and useful Improvements in Hoop-Dressing Machines; and I do hereby declare that the following is a full, clear, and exact description of the same, reference being had to the annexed drawings, making a part of this specification, and to the letters and figures of reference marked thereon.

Figure 5:
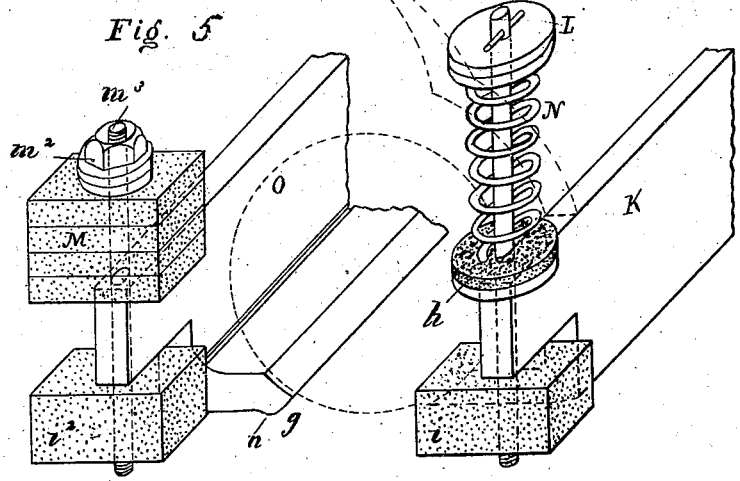
Figure 6:
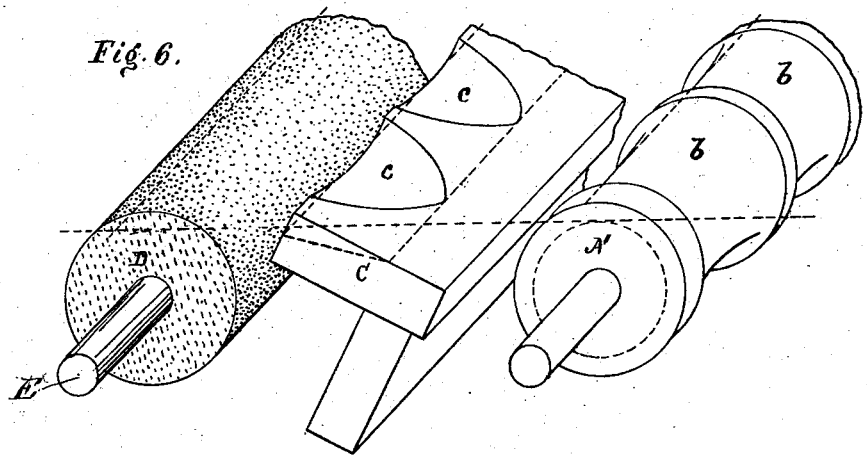
Figure 7:
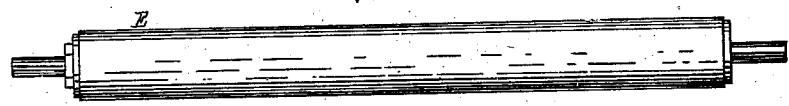

Figure 1 of the drawings is a vertical section of the machine embodying my invention, taken on line $y\ y$ of Fig. 2. Fig. 2 is a front elevation of the machine. Fig. 3 is a top-plan view of Fig. 1, with the upper series of rolls and knife-cylinder broken away. Fig. 4 is a detail view, on an enlarged scale, of the front and rear pressure-bars, knife-cylinder, and bed-roll. Fig. 5 is an enlarged detail of one end of the two presser-bars and means for holding them. Fig. 6 is a detail of the lower feed-roller, the guide, and the elastic bed-roller in front of it; and Fig. 7 is a perspective view of the elastic bed-roller.

This invention has for its object the production of a machine for dressing the woody or heart side of a hoop, the rounded side of which is covered with bark. The hoop to be dressed or planed will preferably be sawed from a pole or tree by means of a band-saw, which cuts the hoop therefrom parallel with the bark of the said pole or tree, notwithstanding the irregularities of its surface; but my machine may be employed to great advantage to dress or plane hoops split from a pole or tree.

The method of sawing hoops from a pole or tree by a band-saw parallel with the bark will form the subject-matter of another application for Letters Patent.

The ordinary process of dressing hoops makes the hoop thinner at points where, by reason of imperfections in the grain of the wood, the hoop should be thicker to enable the hoop to possess uniform strength and elasticity.

It has been atttempted to sustain the bark side of the hoop upon a small roller having its axis in a vertically-movable frame supported by a spring, the latter pressing the woody side of the hoop to be dressed upward against a fixed rest, while the woody side of the hoop is acted upon by a rotating knife-cylinder; but this, in my experiments, has been found very objectionable, for the blow of the knives upon the woody side of the hoop causes the axis of the hoop-supporting roller to descend below its proper level, compressing the springs, which latter, in their effort to rise and place the axis of the said supporting-roller at the proper distance from the axis of the knife-cylinder, cause such a variation in the position of the hoop vertically as to make the knives nick or notch the woody side of the hoop transversely, thus weakening it. My experience also teaches me that like objectionable results follow mounting the axis of the knife-cylinder in movable or spring-held boxes.

In this my invention I do not intend to cut closely from the bark side, as heretofore done, the natural knots, warts, or protuberances thereon; nor do I intend to so cut away the woody or heart side of the hoop to make the hoop of substantially-uniform thickness from end to end. I have found by this latter method of operation that the hoop is so weakened as to render it almost worthless, for the woody part of the hoop is made thinnest where really to obviate the natural imperfections in the grain of the wood it should be left thickest, and such a hoop weakened opposite the knots and warts is not uniformly elastic.

I employ an elastic bed-roller to support the hoop to be dressed or planed, the said bed-roller having its axis placed in fixed bearings. The shaft of this bed-roller, made of steel or iron, is so rigid that it will not spring under the blows of the knives of the knife-cylinder above it, which also has its axis in rigid bearings. The covering for the elastic bed-roll, upon which the bark side of the hoop rests while being dressed or planed upon its woody side by the knives, is of such thickness that the knots, warts, and protuberances are effectually buried therein while passing under the presser-bars and under the knife-cylinder.

In this my machine, by the method herein described, it is possible to dress smoothly and evenly the woody sides of hoops which have not first been trimmed smoothly of the limbs, branches, or knots, which trimming weakens the hoops, and in this my machine the occurrence of a knot, wart, or protuberance on the bark side will not cause the knives to cut deeper into the woody side of the hoop opposite the said knots or protuberances and weaken the woody part of the hoop at such point.

In the accompanying drawings, A represents the frame-work of the machine, similar to that of an ordinary planing-machine, it containing a suitable planing bed-rack, $a$, for supporting the lower rolls, hereinafter mentioned. This bed-rack supports the lower feed-roll A', which, when in position, is below the upper feed-roll, and in front of the presser K and parallel therewith.

The periphery of the feed-roll A' is provided with annular grooves $b$, of different curvature, to correspond approximately with the outside or bark surface of the hoop to be dressed or planed. Immediately behind this lower feed-roll, A', I have herein shown a guide-plate, C, inclined upward and having spaces $c$, corresponding substantially in width with the annular grooves in the feed-roll A', the said spaces $c$ guiding and directing the hoop properly under the knife-cylinder B, and being of such depth as to prevent the under side of the hoop from bearing upon the guide-plate C in the bottoms of spaces $c$ as the hoops pass from the lower feed-roll, A', to the elastic bed-roll D, said bed-roll being located directly under the knife-cylinder B, as shown in Fig. 1.

The bed-roll D, disposed parallel with the knife-cylinder B and with its axis in the same vertical line, is composed chiefly of india-rubber upon an iron or steel shaft of only sufficient size to furnish for the said bed-roller a rigid or unyielding axis. In practice this roll D will be about three inches in diameter. Its metal shaft E will be about seven-eighths of an inch in diameter, thus leaving about one and one-sixteenth inch in thickness of rubber outside the axis E. This bed-roller D, having a yielding surface of the extent and nature described, is of the utmost importance when dressing and planing hoops having knots, knurls, rings, or protuberances of any kind upon its bark surface, as the india-rubber is sufficiently thick to allow all such knots, warts, or protuberances upon the bark side of the hoop, undermost in the machine, to be embedded into it, so that the hoop may be dressed or planed smooth and flat upon its heart or woody side throughout its entire length, the finished hoop, however, varying in thickness according to the size of the knots, warts, or protuberances upon its bark side.

Behind the bed-roll D are two drawing-rolls, F G, for conducting the hoops from the machine after leaving the knife-cylinder, said rolls having a suitable elastic face to prevent marring the bark of the hoops by the necessary pressure between them and the upper drawing-rolls, F' G'. The feeding and drawing rollers are removed sufficiently from the elastic bed-roll to leave the surfaces of the sawed hoops (hoops more or less curved or bulged by sawing parallel with the bark or splitting) free to rise or bulge up or down in front and at the rear of the single elastic bed-roll under the yielding pressers K O, and while the knives cut upon the woody part of the hoop immediately above its single point or support on the single bed-roll.

At the front of the machine, over the lower feed-roller, A', is secured the upper feed-roller, H, which has peculiar-shaped annular or shouldered grooves. This roller H is corrugated in its depressed portions to facilitate feeding the hoops.

Each groove $f$ of the feed-roller H has at one side a nearly-perpendicular shoulder, and the bottom surface of the said groove from the base of the said shoulder is inclined to meet and vanish at the periphery of the said feed-roll, as shown in Fig. 2, thus enabling the thickest edge of the hoop to be canted or to rise, in order that the said thickest edge may be reduced to the thickness of the thin edge. It is obvious that the second and all subsequent hoops sawed from a pole or tree without leaving bark between them, thus wasting stock, will have one thick and one thin edge.

My machine is intended to so dress the woody side of such hoops as to make their edges of even thickness. Poles sufficiently small to be quartered will be grasped and fed by the corrugated parts of the grooves $e$ of roller H.

The front presser-bar, K, located at the rear of feed-roller H and in front of the knife-cylinder, has its front edge projected downward and forward as near the extreme upper portion of the bed-roller D as is possible, and yet permit the knives of the knife-cylinder to meet the hoop in front of the said presser. The lower edge of the presser K barely escapes contact with the revolving knives on the cylinder, presses on the said hoop only at its end, holding it as closely and firmly as possible upon the bed-roll close to the knives, embedding the knots and projections at the bark side of the hoop into the elastic surface of the said roller, thus securing a clean even cut at the woody side of a thin, crooked, or cross-grained hoop. This pressure-bar K rises and falls upon upright standards L L at each end, which standards pass through the pressure-bar. The downward pressure of this bar, as herein shown, is regulated by a spring, N, retained in place by a pin and washer. (Shown best in Fig. 5.) An additional washer or washers, $h$, of rubber, are inserted between the spring and presser-bar at both ends. The pressure-bars K and O rest upon rubber blocks $i$ $i^2$.

The knife-cylinder B is the same as that in ordinary use in planing-machines, and has at one end a suitable pulley to receive a driving-belt. The belt $l$ drives shaft $l'$, having a pulley, m, which, by belt m' and suitable gearing not necessary to be fully described, rotates the feeding and drawing rollers.

Behind the knife-cylinder B is the rear pressure-bar, O. The edges of the pressure-bars are, in practice, brought as closely together as is possible, and permit the knives of the cylinder B to act upon the hoop between them, such location of the ends of the presser-bars enabling the hoop to be pressed firmly down into the material of the elastic bed-roll rather than to be bent around the said roller, as would be the case were the bars more widely separated.

The front lower edge of the presser-bar O is slightly chamfered, as best shown at $g$, Fig. 5, in order to facilitate the entrance under it of the end of the hoop after passing the bed-roll. This pressure-bar has, also, at the rear of the chamfer $g$, a convex rib, $n$, which serves as a narrow pressing-surface to come in contact with the hoop. This rear pressure-bar, O, is held in a yielding manner at each end by elastic washers M on rods $m^3$, having nuts $m^2$, by which to press the washers more or less closely against the ends of the said presser-bar, thus permitting it to adapt itself to the work being done.

Behind the pressure-bar O are affixed the upper drawing-rolls, F' G', directly above and at suitable distances from the corresponding lower rolls, F G.

In operation, one end of the hoop is inserted with the side to be dressed or planed, facing upward between the corrugated upper feed-roll, H, and the lower feed-roll, A', and in one of the grooves of said roll most nearly corresponding to the bark side of the hoop. The elastic surface or face of the roll E allows the projections at the bark side of the hoop to be buried therein, which prevents cutting the hoop so thinly over those points where it is weakened by knots, thus producing a hoop having the same relative strength throughout its entire length, and of substantially-uniform flexibility or without weak points.

For the best and most economical working of the machine, two or more hoops will be inserted at the same time at different points between the feed-rolls, the varying downward pressure of the front pressure-bar, K, embedding the lower surface of each in the elastic bed-roll D, so that they are dressed to nearly-uniform thicknesses.

I do not broadly claim a bed-roller having a thin covering of india-rubber and employed in connection with a knife-cylinder the axis of which is at right angles to the axis of the bed-roller.

Having now fully described my invention, what I claim as new, and desire to secure by Letters Patent, is—

1. In a machine for dressing or planing hoops, the plastic bed-roll D and knife-cylinder D parallel therewith, having their axes in fixed bearings, combined with the pressers to act upon the woody side of the hoop to be dressed, and embed the knots, warts, and protuberances at its bark side into the surface of the said elastic bed-roll, as described, whereby the hoop may be dressed smoothly on its woody side irrespective of and without weakening it at or opposite its knots, warts, or protuberances, substantially as described.

2. The annularly-grooved lower feed-roller, and the upper feed-roller provided with the shouldered groove $f$, to receive a sawed hoop, as described, combined with the elastic bed-roll and knife-cylinder, each having its axis held in stationary bearings, as stated, and with the presser K, to act upon the hoop in front of and embed the projections of the bark side of the hoop into the said elastic bed roll, substantially as described.

3. The annularly-grooved lower feed-roller, and the upper feed-roller, grooved annularly to conform substantially in shape with and receive the hoop to be dressed, and the guide at the rear of the said feed-rolls to direct the movement of the said hoop, combined with the presser K, and the knife-cylinder and elastic bed-roller, each having its axis held in stationary bearings, as and for the purpose described.

4. The elastic bed-roll and knife-cylinder, having their axes in substantially-fixed bearings, and the pressers located each side thereof to embed the knots, warts, and protuberances at the bark side of the hoop into the said elastic bed-roll, combined with the annularly-grooved feeding-rollers and with the drawing-rollers, that one of the drawing-rollers to engage the bark side of the hoop being covered with india-rubber, substantially as described.

5. That improvement in the art or method of dressing flexible hoops which consists in temporarily straightening the crooked hoop in front and at the rear of the top of, and embedding the knots, warts, and protuberances at the bark side of, the hoop into an elastic bed-roll, the surface of which is made to yield to said protuberances, and at the same time dressing or planing the back or woody side of the hoop by a blade which always moves in the same path with relation to the axis of the bed-roll, whereby the proper amount of woody material is retained in the hoop opposite the knots, warts, or protuberances thereon, substantially as described.

HENRY F. CAMPBELL.

Witnesses:
GILES WHEELER,
EDWARD DOW.